United States Patent
Styles

(10) Patent No.: US 7,318,058 B2
(45) Date of Patent: Jan. 8, 2008

(54) SYSTEM AND METHOD OF PROCESSING QUERIES

(75) Inventor: Michael E. Styles, Osgoode (CA)

(73) Assignee: Cognos Incorporated, Ottawa, Ontario (CA)

( * ) Notice: Subject to any disclaimer, the term of this patent is extended or adjusted under 35 U.S.C. 154(b) by 463 days.

(21) Appl. No.: 10/855,078

(22) Filed: May 27, 2004

(65) Prior Publication Data
US 2005/0015393 A1    Jan. 20, 2005

(30) Foreign Application Priority Data
May 27, 2003   (CA) .................................. 2429910

(51) Int. Cl.
*G06F 17/30*    (2006.01)

(52) U.S. Cl. ............................................. 707/3; 707/5
(58) Field of Classification Search ............ 707/104.1, 707/100, 10, 1, 3, 5
See application file for complete search history.

(56) References Cited

U.S. PATENT DOCUMENTS

2002/0107840 A1* 8/2002 Rishe ............................ 707/3

* cited by examiner

*Primary Examiner*—Alam Hosain
*Assistant Examiner*—Leon J Harper
(74) *Attorney, Agent, or Firm*—Pearne & Gordon LLP

(57) ABSTRACT

A parallel detail join system for processing a many-to-one-to-many relationship is provided. The system comprises a parallel detail analysis module for detecting a many-to-one-to-many relationship among elements, and a parallel detail transformation module for generating a SQL: 1999 statement to handle the many-to-one-to-many relationship.

4 Claims, 3 Drawing Sheets

SYSTEM AND METHOD OF PROCESSING QUERIES

FIELD OF THE INVENTION

The invention relates generally to data access middleware, and in particular to a system and method of processing queries.

BACKGROUND OF THE INVENTION

A typical data access environment has a multi-tier architecture. For description purposes, it can be separated into three distinct tiers:
  Web server
  Applications
  Data The tiers are based on business function, and are typically separated by firewalls. Client software, such as a browser or a report-authoring tool, sits above the tiers.

The web server contains a firewall and one or more gateways. All web communication is performed through a gateway. A gateway is responsible for passing on requests to the application server, in tier 2, for execution.

The applications tier contains one or more application servers. The application server runs requests, such as reports and queries that are forwarded by a gateway running on the web server. Typically, one of the components of the applications tier is a query engine, which is data access middleware that provides universal data access to a variety of heterogeneous database systems. The query engine formulates queries (typically SQL) and passes them on to the data tier, through a native database API (such as ODBC) for execution.

The data tier contains database management systems (DBMS), which manage raw data stored in a database. Examples of such systems include Oracle, DB2, and Microsoft SQL Server.

Although a multi-tier architecture can be configured in several different ways, a typical configuration places each tier on a separate computer (server). A database server is typically a "high end" server, and thus can process queries at a relatively fast speed. An application server cannot generally process queries as quickly as a database server.

In order to solve many business questions, a query engine may be required to process queries involving many-to-one-to-many relationships. These types of relationships can be thought of as two one-to-many or master-detail relationships. In other words, the query involves combining a master table with two detail tables. In the past, this problem was dealt with by issuing two separate queries, one for each master-detail table combination and then the stitching the results together. Unfortunately, this requires local processing time on the application server. There is a need to prevent or reduce the amount of local (application server) processing required to process this type of query. Hence, a technique for producing a meaningful result using a single SQL: 1999 (Structured Query Language) statement that can be processed by the DBMS on the database server is desired.

SUMMARY OF THE INVENTION

It is an object of the present invention to provide a technique for performing a parallel detail join through use of a single SQL: 1999 statement.

In accordance with an embodiment of the present invention, there is provided a parallel detail join system for processing a many-to-one-to-many relationship. The system comprises a parallel detail analysis module for detecting a many-to-one-to-many relationship among elements, and a parallel detail transformation module for generating a SQL: 1999 statement to handle the many-to-one-to-many relationship.

In accordance with another embodiment of the present invention, there is provided a method of processing a many-to-one-to-many relationship. The method comprises the steps of detecting a many-to-one-to-many relationship among elements, and generating a SQL: 1999 statement to handle the many-to-one-to-many relationship.

In accordance with another embodiment of the present invention, there is provided a computer data signal embodied in a carrier wave and representing sequences of instructions which, when executed by a processor, cause the processor to perform a method of processing a many-to-one-to-many relationship. The method comprises the steps of detecting a many-to-one-to-many relationship among elements, and generating a SQL: 1999 statement to handle the many-to-one-to-many relationship.

In accordance with another embodiment of the present invention, there is provided a computer-readable medium having computer readable code embodied therein for use in the execution in a computer of a method of processing a many-to-one-to-many relationship. The method comprises the steps of detecting a many-to-one-to-many relationship among elements, and generating a SQL: 1999 statement to handle the many-to-one-to-many relationship.

In accordance with another embodiment of the present invention, there is provided a computer program product for use in the execution in a computer of a parallel detail join system for processing a many-to-one-to-many relationship. The computer program product comprises a parallel detail analysis module for detecting a many-to-one-to-many relationship among elements, and a parallel detail transformation module for generating a SQL: 1999 statement to handle the many-to-one-to-many relationship.

DETAILED DESCRIPTION OF THE PREFERRED EMBODIMENTS

Figure 1:
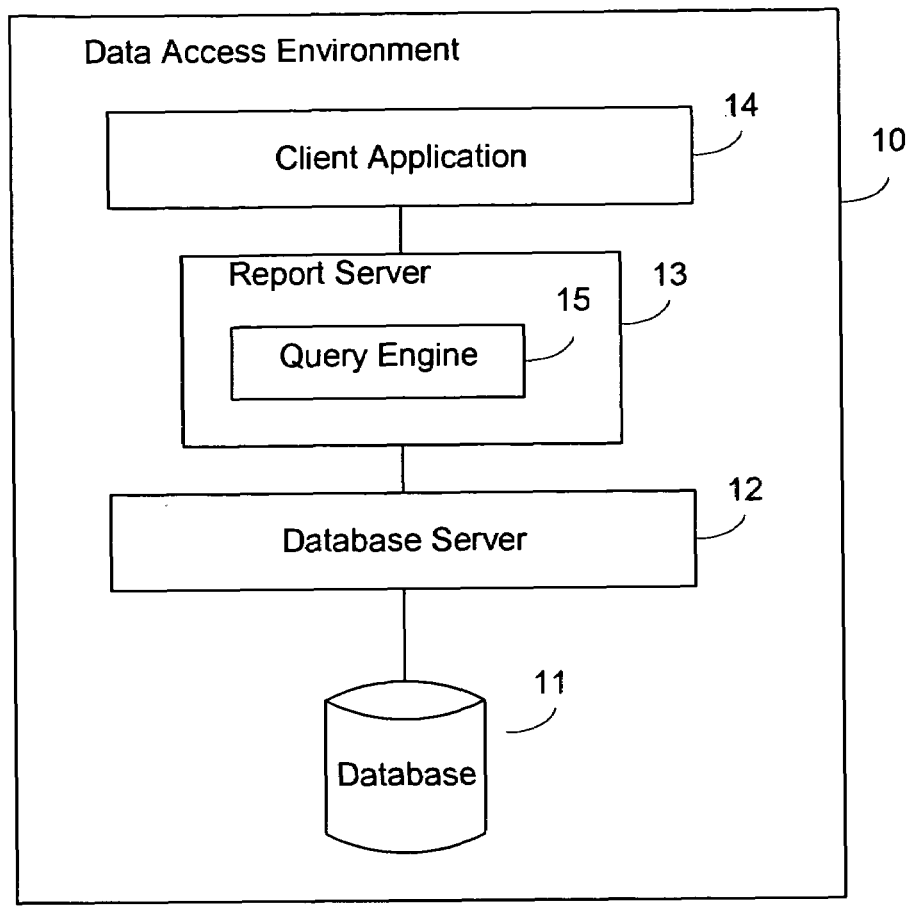
FIG. 1 shows a typical data access environment.

FIG. 1 shows a typical data access environment 10 for processing data. Typically, data is stored in a database 11. A DBMS running on a database server 12 accesses the raw data stored in the database 11. A query engine 15, running on a report server (or application server) 13 is used to generate reports on the raw data and instruct the DBMS on the database server 12 to obtain information pertaining to the raw data in the database 11. The query engine 15 provides universal data access to a variety of heterogeneous database systems. An end user uses a client application 14, running on a client workstation, to facilitate application server 13 operations.

In order to solve many business questions, a query engine may be required to process queries involving many-to-one-to-many relationships. These types of relationships can be thought of as two one-to-many or master-detail relationships. In other words, the query involves combining a master table with two detail tables that may not have the same cardinality. In the past, this problem was dealt with by issuing two separate queries, one for each master-detail table combination and then the stitching the results together. Unfortunately, this requires local processing time on the application server. There is a need to prevent or reduce the amount of local (application server) processing required to process this type of query. Hence, a technique for producing a meaningful result using a single SQL: 1999 (Structured Query Language) statement that can be processed by the DBMS on the database server is desired.

A parallel detail join solves the problem of producing a meaningful result from a many-to-one-to-many relationship using a single SQL: 1999 statement.

Figure 2:
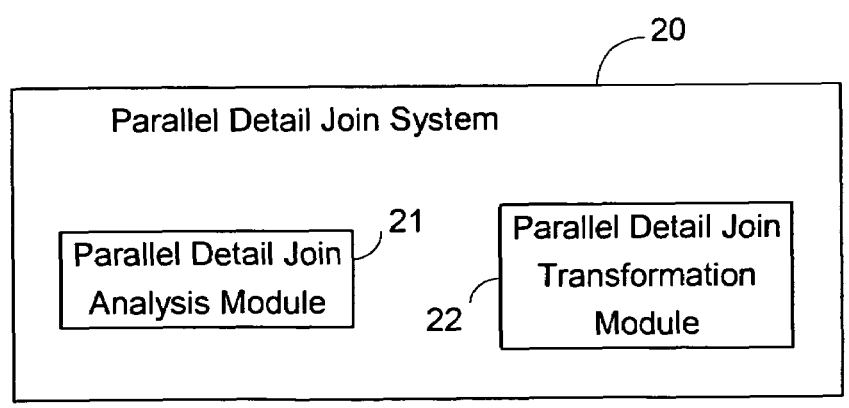
FIG. 2 shows an example of a parallel detail join system, in accordance with an embodiment of the present invention.

FIG. 2 shows an example of a parallel detail join system 20 for processing a many-to-one-to-many relationship, in accordance with an embodiment of the present invention. The parallel detail join system 20 comprises a parallel detail analysis module 21 for detecting a many-to-one-to-many relationship among elements, and a parallel detail transformation module 22 for generating a SQL: 1999 statement to handle the many-to-one-to-many relationship.

Preferably, the parallel detail join system 20 is implemented as a sub-system of the query engine 15 in the data access environment 10. This system 20 generates SQL strings containing embedded XML tags.

Figure 3:
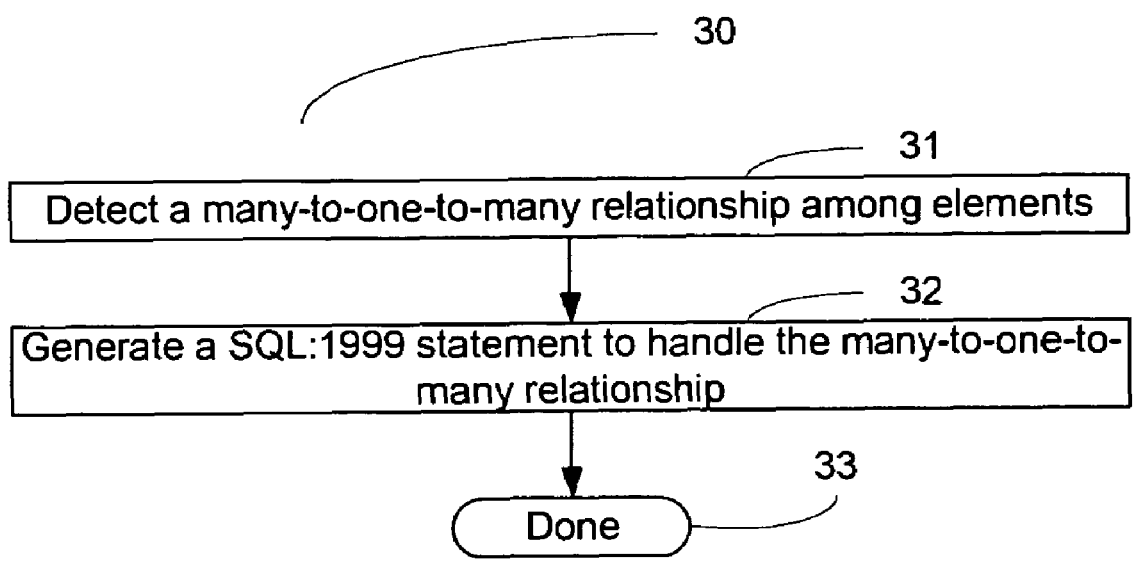
FIG. 3 shows in a flowchart an example of a method of processing a many-to-one-to-many relationship, in accordance with an embodiment of the parallel detail join system.

FIG. 3 shows in a flowchart an example of a method of processing a many-to-one-to-many relationship (30), in accordance with an embodiment of the parallel detail join system 20. The method (30) begins with detecting a many-to-one-to-many relationship among elements (31). Next, a SQL: 1999 statement is generated to handle the many-to-one-to-many relationship (32). The method (30) is done (33).

Advantageously, the generated SQL: 1999 statement may be executed on a database server that handles SQL: 1999. Thus, the parallel detail join system reduces processing that might otherwise be required on the application server, thereby improving performance in many cases.

Figure 4:
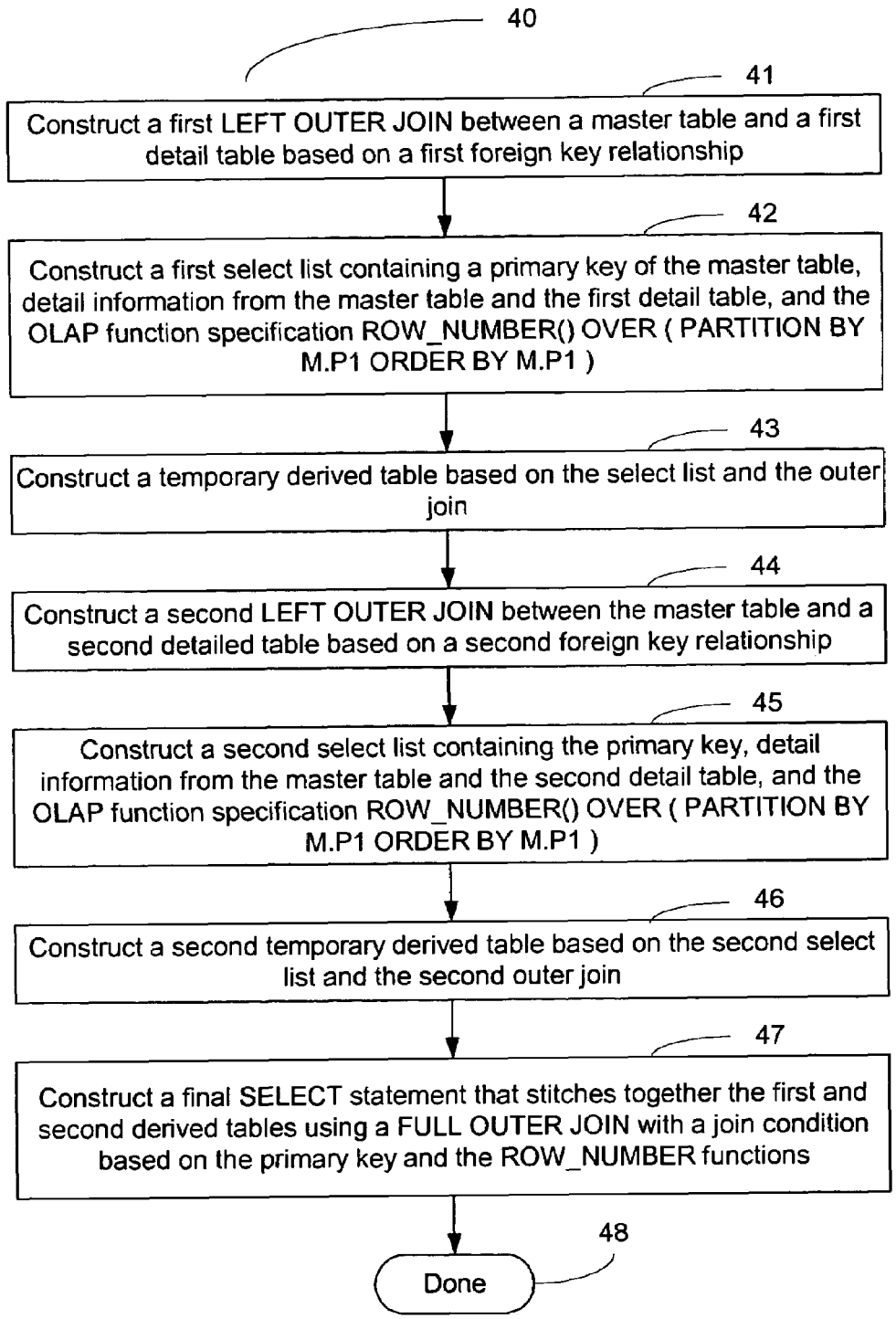
FIG. 4 shows in a flowchart an example of a method of constructing a parallel detail join, in accordance with an embodiment of the parallel detail join system.

FIG. 4 shows in a flowchart an example of a method of constructing a parallel detail join (40), in accordance with an embodiment of the parallel detail join system 20. Assume we have three tables M (master table) with primary key P1, D1 (detail table 1) with foreign key F1, and D2 (detail table 2) with foreign key F2. There is a one-to-many relationship between M and D1 (D1→F1), and a one-to-many relationship between M and D2 (P1→F2). The steps include:

1. Construct a LEFT OUTER JOIN between M and D1 based on the foreign key relationship (41) (i.e., M LEFT OUTER JOIN D1 ON M.P1=D1.F1).
2. Construct a select list containing M.P1, any other detail information required from M and D1, and the OLAP function specification ROW_NUMBER( ) OVER (PARTITION BY M.P1 ORDER BY M.P1) (42).
3. Construct a derived table T1 based on this select list and the outer join (43).
4. Construct a LEFT OUTER JOIN between M and D2 based on the foreign key relationship (44) (i.e., M LEFT OUTER JOIN D2 ON M.P1=D2.F2).
5. Construct a select list containing M.P1, any other detail information required from M and D2, and the OLAP function specification ROW_NUMBER( ) OVER (PARTITION BY M.P1 ORDER BY M.P1) (45).
6. Construct a derived table T2 based on this select list and the outer join (46).
7. Construct a final SELECT statement that stitches together the derived tables T1 and T2 using a FULL OUTER JOIN with a join condition based on the primary key of M and the ROW_NUMBER functions (47):

```
SELECT ...
FROM ( SELECT M.P1, ...,
        ROW_NUMBER( ) OVER (
          PARTITION BY M.P1 ORDER BY M.P1) ID
      FROM  M LEFT OUTER JON D1 ON M.P1 = D1.F1 ) T1
FULL OUTER JOIN
     ( SELECT M.P1, ...,
        ROW_NUMBER( ) OVER (
          PARTITION BY M.P1 ORDER BY M.P1 ) ID
      FROM  M LEFT OUTER JOIN D2 ON M.P1 = D2.F2 ) T1
ON   T1.P1 = T2.P1
AND  T1.ID = T2.ID
```

EXAMPLE

Assume we have the following sample database. There is a one-to-many relationship between EMPLOYEES and BILLINGS, and a one-to-many relationship between EMPLOYEES and SKILLS. The BILLINGS and SKILLS tables have different cardinalities.

Employees

| ID | NAME |
|---|---|
| 1 | Stan |
| 2 | Mike |
| 3 | John |

Billings

| ID | AMOUNT |
|---|---|
| 1 | 100 |
| 1 | 400 |
| 1 | 500 |
| 3 | 600 |

Skills

| ID | SKILL |
|---|---|
| 1 | Cobol |
| 1 | C |
| 2 | Pascal |
| 2 | Visual Basic |

The desired result is shown below:

| ID | NAME | AMOUNT | SKILL |
|----|------|--------|-------|
| 1 | Stan | 100 | Cobol |
| 1 | Stan | 400 | C |
| 1 | Stan | 500 | NULL |
| 2 | Mike | NULL | Pascal |
| 2 | Mike | NULL | Visual Basic |
| 3 | John | 600 | NULL |

This can be accomplished with the following SQL: 1999 query:

```
SELECT COALESCE( D1.ID, D2.ID ),
    COALESCE( D1.NAME, D2.NAME ),
    D1.AMOUNT,
    D2.SKILL
FROM ( SELECT T1.ID, T1.NAME, T2.AMOUNT,
       ROW_NUMBER( ) OVER (
           PARTITION BY T1.ID ORDER BY T1.ID ) RN
    FROM   EMPLOYEES T1 LEFT OUTER JOIN BILLINGS T2
    ON   T1.ID = T2.ID ) D1
FULL OUTER JOIN
    ( SELECT T1.ID, T1.NAME, T2.SKILL,
       ROW_NUMBER( ) OVER (
           PARTITION BY T1.ID ORDER BY T1.ID ) RN
    FROM   EMPLOYEES T1 LEFT OUTER JOIN SKILLS T2
    ON   T1.ID = T2.ID ) D2
ON  D1.ID = D2.ID
AND  D1.RN = D2.RN
```

EXPLANATION

In this example, the master table EMPLOYEES is combined with detail tables BILLINGS and SKILLS. The detail tables have different cardinalities, resulting in NULL values being returned in certain columns of the result set.

The systems and methods according to the present invention may be implemented by any hardware, software or a combination of hardware and software having the functions described above. The software code, either in its entirety or a part thereof, may be stored in a computer readable memory. Further, a computer data signal representing the software code that may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A computer implemented system for processing a many-to-one-to-many relationship, the system comprising:
a parallel detail analysis module for detecting a many-to-one-to-many relationship among elements; and
a parallel detail transformation module for generating a SQL: 1999 statement to handle the many-to-one-to-many relationship, the parallel detail transformation module including:
means for constructing a first LEFT OUTER JOIN between a master table and a first detail table based on a first foreign key relationship;
means for constructing a first select list containing a primary key of the master table, detail information from the master table and the first detail table, and the OLAP function specification ROW_NUMBER( ) OVER (PARTITION BY M.P1 ORDER BY M.P1);
means for constructing a first temporary derived table based on the select list and the outer join;
means for constructing a second LEFT OUTER JOIN between the master table and a second detail table based on a second foreign key relationship;
means for constructing a second list containing the primary key, detail information from the master table and the second detail table, and the OLAP function specification ROW_NUMBER( ) OVER (PARTITION BY M.P1 ORDER BY M.P1);
means for constructing a second temporary derived table based on the second select list and the second outer join; and
means for constructing a final SELECT statement that stitches together the first and second derived tables using a FULL OUTER JOIN with a join condition based on the primary key and the ROW_NUMBER functions.

2. A method of processing a many-to-one-to-many relationship, the method comprising the steps of:
detecting a many-to-one-to-many relationship among elements; and
generating a SQL: 1999 statement to handle the many-to-one-to-many relationship, including the steps of:
constructing a first LEFT OUTER JOIN between a master table and a first detail table based on a first foreign key relationship;
constructing a first select list containing a primary key of the master table, detail information from the master table and the first detail table, and the OLAP function specification ROW_NUMBER( ) OVER (PARTITION BY M.P1 ORDER BY M.P1);
constructing a first temporary derived table based on the select list and the outer join;
constructing a second LEFT OUTER JOIN between the master table and a second detail table based on a second foreign key relationship;
constructing a second list containing the primary key, detail information from the master table and the second detail table, and the OLAP function specification ROW_NUMBER( ) OVER (PARTITION BY M.P1 ORDER BY M.P1);
constructing a second temporary derived table based on the second select list and the second outer join; and
constructing a final SELECT statement that stitches together the first and second derived tables using a FULL OUTER JOIN with a join condition based on the primary key and the ROW_NUMBER functions.

3. A computer-readable medium having computer readable code embodied therein for use in the execution in a computer of a method of processing a many-to-one-to-many relationship, the method comprising the steps of:
detecting a many-to-one-to-many relationship among elements; and
generating a SQL: 1999 statement to handle the many-to-one-to-many relationship, including the steps of:
constructing a first LEFT OUTER JON between a master table and a first detail table based on a first foreign key relationship;
constructing a first select list containing a primary key of the master table, detail information from the master table and the first detail table, and the OLAP function specification ROW_NUMBER( ) OVER (PARTITION BY M.P1 ORDER BY M.P1);

constructing a first temporary derived table based on the select list and the outer join;

constructing a second LEFT OUTER JON between the master table and a second detail table based on a second foreign key relationship;

constructing a second list containing the primary key, detail information from the master table and the second detail table, and the OLAP function specification ROW_NUMBER( ) OVER (PARTITION BY M.P1 ORDER BY M.P1);

constructing a second temporary derived table based on the second select list and the second outer join; and constructing a final SELECT statement that stitches together the first and second derived tables using a FULL OUTER JOIN with a join condition based on the primary key and the ROW_NUMBER functions.

4. A computer program product for use in the execution in a computer of a parallel detail join system for processing a many-to-one-to-many relationship, the computer program product comprising:

a parallel detail analysis module for detecting a many-to-one-to-many relationship among elements; and a parallel detail transformation module for generating a SQL: 1999 statement to handle the many-to-one-to-many relationship, the parallel detail transformation module including:

means for constructing a first LEFT OUTER JOIN between a master table and a first detail table based on a first foreign key relationship;

means for constructing a first select list containing a primary key of the master table, detail information from the master table and the first detail table, and the OLAP function specification ROW_NUMBER( ) OVER (PARTITION BY M.P1 ORDER BY M.P1);

means for constructing a first temporary derived table based on the select list and the outer join;

means for constructing a second LEFT OUTER JOIN between the master table and a second detail table based on a second foreign key relationship;

means for constructing a second list containing the primary key, detail information from the master table and the second detail table, and the OLAP function specification ROW_NUMBER( ) OVER (PARTITION BY M.P1 ORDER BY M.P1);

means for constructing a second temporary derived table based on the second select list and the second outer join; and means for constructing a final SELECT statement that stitches together the first and second derived tables using a FULL OUTER JOIN with a join condition based on the primary key and the ROW_NUMBER functions.

* * * * *

UNITED STATES PATENT AND TRADEMARK OFFICE
CERTIFICATE OF CORRECTION

PATENT NO. : 7,318,058 B2 Page 1 of 1
APPLICATION NO. : 10/855078
DATED : January 8, 2008
INVENTOR(S) : Michael E. Styles It is certified that error appears in the above-identified patent and that said Letters Patent is hereby corrected as shown below:

In column 6, line 62, please replace the word "JON" with --JOIN--.

Signed and Sealed this

Twenty-seventh Day of May, 2008

JON W. DUDAS
*Director of the United States Patent and Trademark Office*